United States Patent [19]
Munoz-Garcia et al.

[11] Patent Number: 6,115,606
[45] Date of Patent: Sep. 5, 2000

[54] USER TERMINAL ACCESS IN SATELLITE COMMUNICATION SYSTEMS

[75] Inventors: Samuel G. Munoz-Garcia; Patrick Chomet; Dennis Roy Mullins, all of London, United Kingdom

[73] Assignee: Inmarsat, Ltd., London, United Kingdom

[21] Appl. No.: 08/915,601

[22] Filed: Aug. 21, 1997

[51] Int. Cl.$^7$ .................................................. H04B 7/185
[52] U.S. Cl. ..................... 455/427; 455/12.1; 455/13.1; 342/357
[58] Field of Search .................................. 455/427, 428, 455/12.1, 13.1, 35.1, 54.1, 54.2, 53.1, 56.1, 69, 70, 434, 421; 342/357; 370/310, 318

[56] References Cited

U.S. PATENT DOCUMENTS

| | | | |
|---|---|---|---|
| 5,448,623 | 9/1995 | Wiedeman et al. | 379/59 |
| 5,604,920 | 2/1997 | Bertiger et al. | 455/13.1 |
| 5,752,162 | 5/1998 | Sawyer et al. | 455/13.1 |
| 5,812,932 | 9/1998 | Wiedeman et al. | 455/13.1 |

FOREIGN PATENT DOCUMENTS

| | | |
|---|---|---|
| 0 526 921 A1 | 4/1993 | European Pat. Off. . |
| 0 562 374 A1 | 9/1993 | European Pat. Off. . |
| 2 275 588 | 8/1994 | United Kingdom . |
| 2281 014 | 2/1995 | United Kingdom . |
| 2 295 296 | 5/1996 | United Kingdom . |

*Primary Examiner*—Wellington Chin
*Assistant Examiner*—Pablo N. Tran
*Attorney, Agent, or Firm*—McDermott, Will & Emery

[57] ABSTRACT

A satellite communications system comprises satellites 9A–C, earth stations 7A–E, user terminals 11 and controlling gateways 3 in the form of mobile satellite switching centers 5A–E. Access with a user terminal 11 may be gained to a terrestrial telephone system 1 by earth stations 7A–E contacting the satellites 9A–C and by the satellites contacting the user terminals 11. The satellites 9A–C periodically broadcast messages indicative of the earth station 7A–E with which they are instantly in contact. The user terminal 11 listens to and logs these broadcasts to keep a list of the relative number of times each earth station 7A–E can be heard. When calling into the system, the user terminal pages earth stations in descending order of number of entries in the log. When in contact, the user terminal 11 sends the log to the system. When subsequently trying to contact the user terminal 11, the system uses earth stations in descending order of number of entries on the log, last received from the user terminal.

11 Claims, 3 Drawing Sheets

USER TERMINAL ACCESS IN SATELLITE COMMUNICATION SYSTEMS

FIELD OF THE INVENTION

This invention relates to a telecommunication system where remote user terminals are in receipt of access to a larger telecommunication system by means of direct access to a satellite which, in turn, is in communication with a ground station. It particularly relates to a system where, potentially, a user terminal can access more than one satellite and where, via a satellite or satellites, can access more than one ground station.

BACKGROUND

First, it is necessary to describe the general terrestrial telephone system. This is the "larger telecommunication system" mentioned above.

The terrestrial telephone system comprises the sum of all of the wire, optical, point-to-point microwave and any other means of conducting signals from one point to another via the surface of the earth, together with their associated switches, amplifiers, encoders, decoders, amplifiers and repeaters. On a national level, the network links all access points in a country. Country is linked to country via international trunk lines. Oceans are spanned by submarine cables. The terrestrial network is a transparent carrier where a signal may be introduced from an access point and routed to another, selected access point elsewhere on the surface of the earth. A subscriber can access the terrestrial system via various gateways. For example, the terrestrial system can be accessed from the public switched telephone network, a public switched data network, an integrated switched digital network, a cellular telephone system, or a satellite telephone system. Each gateway provides a plurality of different access points, which, depending upon the gateway, can range from a simple telephone to a complex data or image source. The subscriber's gateway, at the subscribers request, commands the terrestrial system to route and carry the message from the subscriber to a selected destination. The message comes in through the subscriber's gateway, passes through the terrestrial system, and exits through the selected destination gateway to reach the access point required. Once the message path is established, two-way communication can commence. This is the way the terrestrial system works. each gateway is connected to another single gateway. The terrestrial system is not adapted, readily, to switch, during the course of a message, between different source gateways or between different destination gateways.

Each gateway, in what is generally understood to be a telephone system, provides a plurality of access points whereby a subscriber may make or receive calls. Each access point is unique in its identity or location and definitely is unique to its particular gateway. In other words, one access point means one gateway.

Now, satellite systems provide a gateway to the terrestrial system via earth stations, capable of establishing two way contact with a satellite or satellites. In turn, the satellites can communicate with user terminals (portable handsets). The user terminals are thus put in contact with the earth stations which can act as a gateway to the terrestrial system.

Each earth station is a separate gateway. Generally, the earth stations may be widely spread apart, for example, one earth station on each continent. Thus, in general, each user terminal will see satellites which are visible only to one earth station. This satisfies the terrestrial network requirement "one access point means just one gateway", This situation is not a problem. However, there a circumstances, for example, in the middle of the pacific ocean, in the middle of the Sahara Desert, or high atop the Andes, where a user terminal may be able to see a satellite or satellites which, in turn, are visible to more than one earth station. This now breaks the rule "one access point means just one gateway". The user terminal is an access point. Each earth station is a gateway. Now there is the situation "one access point-many gateways". The terrestrial network is not adapted to respond to multiple gateways. Further, the signals to and from the earth station, satellites and user terminals are forever changing. What was a perfectly good satellite link a moment ago is no longer functional because the satellite has moved, the user terminal has been shielded by a building or other structure, and a host of other reasons. However, one of the other potential user terminal to satellite to ground station links might still work. How can the switch between ground stations be effected without confusing the operation of the terrestrial network? How does the system know which ground station is best placed to establish contact with the user terminal? How does the user terminal know which ground station to page when it needs to make contact? Much time and fruitless effort could be wasted in attempting to reach user terminals or earth stations with little hope of establishing contact. The present invention seeks to provide a solution involving minimal cost and a high degree of probability of establishing contact.

SUMMARY OF THE INVENTION

According to one aspect, the present invention consists in a communication system wherein a user terminal can communicate with a plurality of satellites; wherein each of said plurality of satellites can communicate with a plurality of earth stations; and wherein each of said plurality of satellites is operative, periodically, to provide messages, receivable by said user terminal, indicative of which of said plurality of earth stations said each satellite is in instant contact; said system being characterised by said user terminal being operative to maintain a running log indicative of the number of instances it has received a message from a satellite in contact with each particular earth station; and system being operative, thereafter, to employ said log to control with which out of said plurality of earth stations contact is established with said user terminal.

The invention further provides a system wherein said user terminal, when attempting to establish contact with an earth station, is operative to page that earth station with the largest number of entries in said log, and, in the event of failing to page said earth station with the largest number of entries in said log, is operative to page each earth station in said log, in turn, in descending order of number of entries, until an earth station is found which responds to being paged.

The invention further provides a system operative to receive said log from said user terminal and operative thereafter, when attempting to page said user terminal, to employ that earth station with the largest number of entries in said log, and, in the event of said earth station with the largest number of entries in said log failing to page said user terminal, employing each earth station, in said log, in turn, in descending order of number of entries in said log, until an earth station is found which can successfully page said user terminal.

According a second aspect, the present invention further consists in a method for controlling a system wherein a user terminal can communicate with a plurality of satellites, wherein each of said plurality of satellites can communicate with a plurality of earth stations, and wherein each of said plurality of satellites is operative, periodically, to provide messages, receivable by said user terminal, indicative of which of said plurality of earth stations said each of said plurality of satellites is instantly in contact; said method including the steps of: said user terminal maintaining a running log indicative of the number of times it has received a message from a satellite in contact with each particular earth station; and employing said log to control with which out of said plurality of earth stations contact is established with said user terminal.

The second aspect of the invention further provides a method including the step, when attempting to establish contact from said user terminal, of paging each earth station, on said log, in turn, in descending order of number of entries on said log, until an earth station is found which responds to being paged.

The second aspect of the invention yet further provides a method including the steps, of receiving said log from said user terminal and, when attempting to establish contact with said user terminal, of employing each earth station, on said log, in turn, in descending order of number of entries in said log, until an earth station is found which can establish contact with said user terminal.

According to a third aspect, the present invention consists in a user terminal for use in a system wherein said user terminal can communicate with a plurality of satellites and wherein each of said plurality of satellites is operative, periodically, to provide messages indicative of which particular earth station out of a plurality of earth stations the satellite is in instant contact; said user terminal comprising means for receiving said messages; means for maintaining a running log of the number of times each earth station is indicated in said messages; and means, when attempting to page an earth station, operative to page each earth station in said log, in turn, in descending order of the number of entries in said log, until an earth station is found which responds to being paged.

Each of the first, second and third aspects of the invention further provide that said log includes only those entries noted over an immediately preceding predetermined period of time.

In a preferred embodiment, the satellite earth stations are gateways to the terrestrial system. The user terminal preferably has a program, stored on its subscriber identity module, a card including a microprocessor and memory, to execute the activities required. The individual earth stations, for preference, have means for storing the log, origination from the user terminal, and contain appropriate routines, within their controlling supervisory systems, to respond to the log in the manner hereinbefore and hereinafter described.

BRIEF DESCRIPTION OF THE DRAWINGS

The present invention is further explained, by way of an example, by the following description, read in conjunction with the appended drawings, in which.

DESCRIPTION OF EMBODIMENTS

Figure 1:
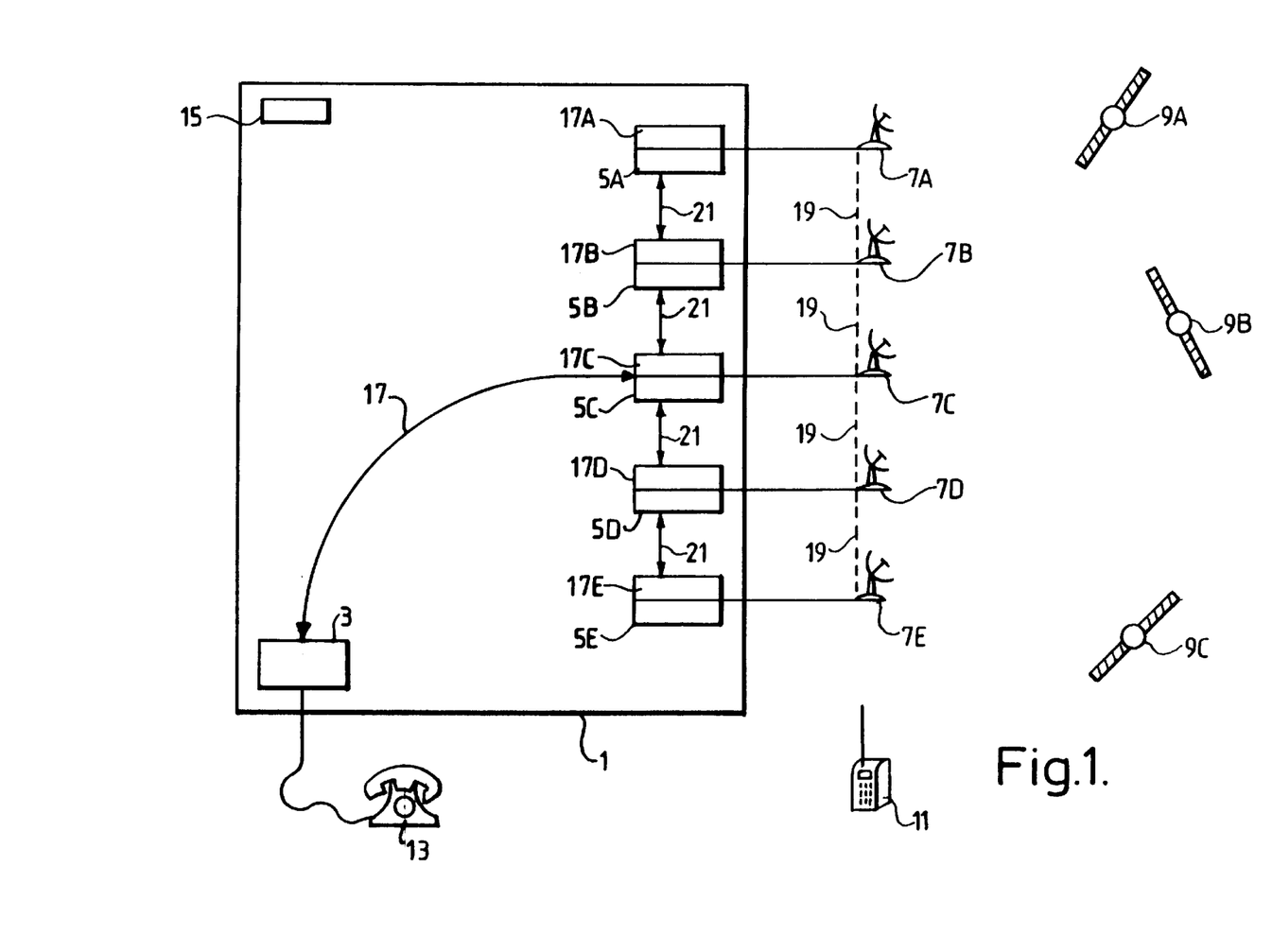
FIG. 1 is a highly schematised representation of the global communications system within which the present invention is comprised and showing a mobile satellite switching centre, acting as a gateway to the terrestrial system, and also acting as a controller to an earth station.

Attention is first drawn to FIG. 1. The terrestrial system 1 comprises a plurality of gateways 3 which may be individual national public or cellular telephone systems, public data switched data networks, public land mobile systems, other satellite system, and so on. Included in the gateways are a number of mobile satellite switching centres 5A 5B 5C 5D 5E. Each mobile satellite switching centre 5A–E is uniquely connected to one, and only one, earth station 7A 7B 7C 7D. The earth stations 7A–E are scattered about the world. They are designed to interact with a constellation of satellites 9A 9B 9C, in two orthogonal orbits, with ten operational satellites in each orbit with two spares, each orbit at 45 degrees to the equator and at a height of 10,500 Km from the surface of the earth. This is only an example of one satellite system with which the present invention would work. As will become apparent to those skilled in the art upon reading the following description and claims, the invention is applicable to virtually any satellite system where a multiple gateway problem arises so far as interaction with a user terminal (portable handset or other device intended to communicate directly with a satellite).

Each of the earth stations 7A–E can communicate with any of the satellites 9A–C which may be within its line of sight. At any one time, different satellites 9A–C may be in the line of sight of different earth stations 7A–E. Some satellites 9A–E may be visible to more than one earth station 7A–E.

A user terminal 11, otherwise unconnected to the terrestrial system 1 because it is remote or does not have the ability so to connect, is able to exchange radio signals with any of the satellites 9A–C which may be in its line of sight and sufficiently elevated above the horizon for communication to be established and maintained. The user terminal 11 is generally in the form of a portable radio telephone handset, not unlike a cellular radio telephone handset, but adapted to function with satellites 9A–C. Now, a satellite 9A–C, visible to the user terminal 11, may, in turn, be visible to more than one earth station 7A–E. Likewise, more than one satellite 9A–C may simultaneously be visible to the user terminal 11 so that a user terminal 11, potentially, may be in simultaneous contact with multiple earth stations 5A–E.

When a subscriber 13 wishes to call the user terminal 11 the terrestrial system 1, recognising the unique identifier of the user terminal 11, is referred to a home location register 15, located within the terrestrial system 1. The home location register 15 is the normal register whereat the details of the user terminals 11 are stored, and may, physically, be located proximate to the point where the user terminal 11 is generally located. For the purpose of this example, it is assumed that the user terminal 11 has moved, and is no longer in its usual location.

At some point, the user terminal 11 has logged on to a satellite and has thus engaged one of the mobile satellite switching centres 5A 5B 5C 5D. This is its visitor location. Each mobile satellite switching centre 5A–E comprises a corresponding visitor location register 17A–E. When the User terminal 11 logged on to the terrestrial system 1 via the earth station 7A–E to which it selected access and, in turn, onto its corresponding gateway, which, in this instance, is the related mobile satellite switching centre SA–E, a message is sent through the terrestrial system 1 so that the identity of the particular gateway 5A–E wherethrough the user terminal 11 might be found, is stored in the home location register 15. When the subscriber 13 attempts to call the user terminal 11, reference is first made to the home location register 15. The home location register 15 now holds the identity of the gateway 5A–E wherethrough the user terminal 11 is to be found. The audio signal, from the subscriber and via the subscriber's gateway 3, is routed directly to the visitor location (let us say 5C) whereat the user terminal 11 is registered.

As a result of the operation of the terrestrial system 1, the subscriber 13 is directly connected, via the subscriber's gateway 3, for two way voice communication, as indicated by the arrow 17, to the relevant mobile satellite switching centre 5C, whereon the user terminal 11 happens to be registered as a "visitor location"

Now, so far, everything, as described, is straight foward, so far as the terrestrial system 1 is concerned. A subscriber 13 has gone through his related gateway 3 to access another gateway 5C for establishment of two way communications. From now on, things become a little more complicated because the user terminal 11 happens to be connected via an earth station SC whereat the connection via the relevant satellite 9A–C is a transient possibility and whereat the possibility of any form of satellite connection between the user terminal 11 and the earth station 5c whereat the visitor location information 17C happens to be stored is, at best, uncertain, At any moment, the earth station 5A–C could change from the visitor location earth station 5C to one of the others 5A 5B 5D 5E. This is because satellites are constantly changing their position with respect to the user terminal 11 and with respect to the earth stations 5A–E. Conditions can change, making the location of the best positioned earth station 7A–E a matter of some uncertainty.

Each of the earth stations 7A–E is linked to every other earth station 7A–E by a low capacity digital link 19 capable of passing instructions and responses between the earth stations 7A–E but of insufficient capacity to carry voice signals.

Each mobile satellite switching centre 5A–E is linked, via the terrestrial network 1, to every other mobile satellite switching centre 5A–E by a voice link 21 capable of two way voice grade communication.

The digital link 19 is a simple packet network and it is envisaged that this can be a permanent connection. Alternatively, it can consist in leased or borrowed time slots in systems comprising part of the terrestrial system.

The voice link 21 is an expensive item to create and to run. It is to be recalled that the earth stations 7A–E may be many thousands of kilometers apart and more likely separated by oceans. Thus, the associated mobile satellite switching centres 5A–5E are similarly separated. While it is within the scope of the present invention that the voice link 21 can be a permanent, dedicated voice grade channel or channels, it is preferred that the voice link 21 is a line, already existing within the terrestrial network and which can be called upon when required. For example, when one mobile satellite switching centre 5C wishes to call another 5E, being itself a gateway, the one mobile satellite switching centre 5C simply places a call through the terrestrial system 1 to the other 5E and establishes the voice link 21 that way. This example is not intended to be restrictive, and those, skilled in the art, will be aware of numerous other ways in which the voice link 21 can be created.

Figure 2:
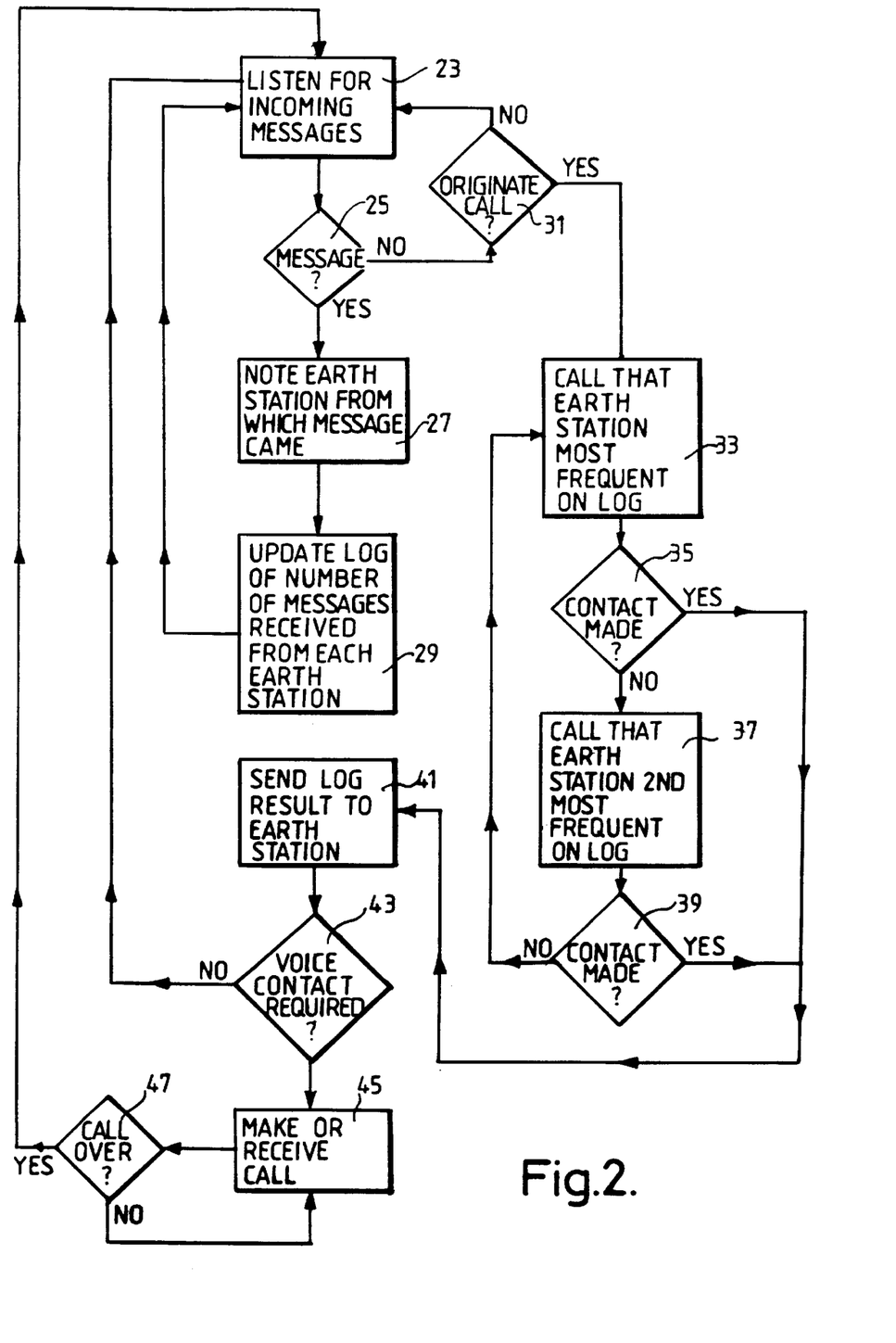
FIG. 2 is a flow chart of the activities of the user terminal when interacting with the system of FIG. 1.

FIG. 2 is a flowchart of the behaviour of the user terminal 11.

Even when not functional in the ordinary sense, the user terminal 11 is active and monitoring incoming messages. Each of the satellites 9A–C puts out constant general messages for the information and instruction of whatever user terminals 11 can hear them. In a first activity 23, the user terminal 11 hears the messages, broadcast from the satellites 9A–C. These messages contain information concerning with which earth station 7A–E the particular satellite is in contact. If a first test 25 detects a general message from a satellite 9A–C, control is passed to a second activity 27 where the information is extracted concerning from which earth station 7A–E the message originated. Control then passes to a third activity which updates a running log of the number of general messages received from each earth station.

The log keeps a record of the number of messages, received in a predetermined time, from each earth station 7A–C which can be heard. The log thus represents a measure of the relative accessibility of each earth station 7A–C. The predetermined period can be as long as a day or as short as a few minutes, depending upon the service required. For example, if the user terminal is in a slow moving vehicle such as a sailing boat or a land vehicle in a desert, the rate of change of position is relatively slow so that a log, kept over a day, will contain valid information about the most easily accessible earth station 7A–C. On the other hand, if the user terminal is in a fast vehicle, such as an aircraft or a low orbiting space vehicle, the rate of change of position is very fast so that a log lasting over just a few minutes will give the best information.

Control is passed from the third activity 29 back to the first activity 23 where the user terminal 11 continues to monitor messages from the satellites 9A–C.

If the first test 25 detects no message, a second test 31 looks for any necessary call making activity which may be required. If no call making activity is required, control is passed back to the first activity 23 where the user terminal 11 continues to monitor messages from the satellites 9A–C.

If the second test 31 detects a call making requirement, control is passed to a 4th Activity 33.

The call making requirement may come from various sources. The user terminal 11 is required, after a predetermined lapse of time, to call into the satellite system to "log on" to confirm its presence and, by means outside the boundaries of the present invention, to indicate its approximate location on the surface of the earth. Equally, the owner of the user terminal 11 may wish to make a telephone call. Similarly, an earth station 7A–C may have paged the user terminal 11 and require a response. This list is merely representative and not exhaustive of the various reasons the user terminal 11 may wish to originate a call.

The fourth activity 33 looks up the log, selects that earth station 7A–E which has the most log entries, and causes the user terminal 11 to page that earth station 7A–E. A third test 35 monitors whether or not the called earth station responds. If no response is received, control is passed to a fifth activity 37 which causes the user terminal 11 to attempt to page that earth station with the second largest number of entries in the log. If a fourth test 39 does not detect that contact has been made, control can be passed back to the fourth activity 33 to attempt, once more, to page the most likely earth station 7A–E. Not shown in the flow chart, but implicit from this example, is the possibility of going right down the list of earth stations 7A–E in the log until one is found that responds. Also not shown, but also implicit, is the possibility that the fourth test 39, or its equivalent depending on how may earth stations 7A–E on the log are paged, simply terminates the attempt to raise an earth station 7A–E and passes control back to the first activity 23, or passes control back to the first activity 23 after a predetermined number of attempts to raise different earth stations 7A–E.

In the above manner, the user terminal 11 gains access to the terrestrial system 1 via the satellites 9A–C and the earth stations 7A–E in the most expeditious manner possible and with the highest probability of a successful connection.

When contact is made, a sixth activity 41 sends, among other information which is of no concern to this invention, details of the log to that earth station 7A–E with which contact is made. The mobile satellite switching centre 5A–E contains a register, capable of storing the log information. The mobile satellite switching centre 5A–E is capable, in a manner hereinafter to be described, to utilise the log data expeditiously to access the user terminal 11 in a manner most likely to achieve contact with the user terminal 11. If no voice contact is required (i.e. the user terminal 11 is not required to make or receive a call), a fifth test 43 passes control back to the first activity 23. If voice contact is required, a seventh activity 45 makes or receives the call until a sixth test 47 detects that the call is over and passes control back to the first activity 23.

Now, if the call was originated from the user terminal 11, the Mobile Satellite Switching Centre 5A–E associated with the earth station 7A–E which received the contact from the user terminal becomes the visitor location of that user terminal and details of the particular user terminal 11 are transferred from the home location register 15 in the terrestrial system 1 into the visitor location register 17A–E in the appropriate Mobile Satellite Switching Centre 5A–E. Under the terms of the present invention, the log details, transferred in the sixth activity 41 to the earth station 7A–E, are also stored in association with the details held in the visitor location register 17A–E.

It may be that the particular earth station 7A–E that the user terminal 11 ultimately contacted was not that earth station 7A–E with the highest number of entries in the log. In this instance, it may not be expedient for the user terminal 11 to register as a visitor location at that earth station 7A–E since the probability of making contact, despite the success of the last attempt, is actually below a predetermined threshold. In such an instance, the user terminal 11 elects not to register as a visitor location at that earth station 7A–E with which it is in contact, and so signals to the earth station 7A–E with which it is in contact its intention not to register, and also signals to the particular earth station which the user terminal 11 contacted the identity of the earth station 7A–E whereat the user terminal 11 is currently registered as a visitor location. The particular earth station which was contacted then uses the digital link 19 to signal the main earth station 7C whereat the user terminal 11 is currently registered to establish a voice link 21 and then for the main earth station 7C to proceed as from the 14th activity 73 hereinafter described with reference to FIG. 3.

Figure 3:
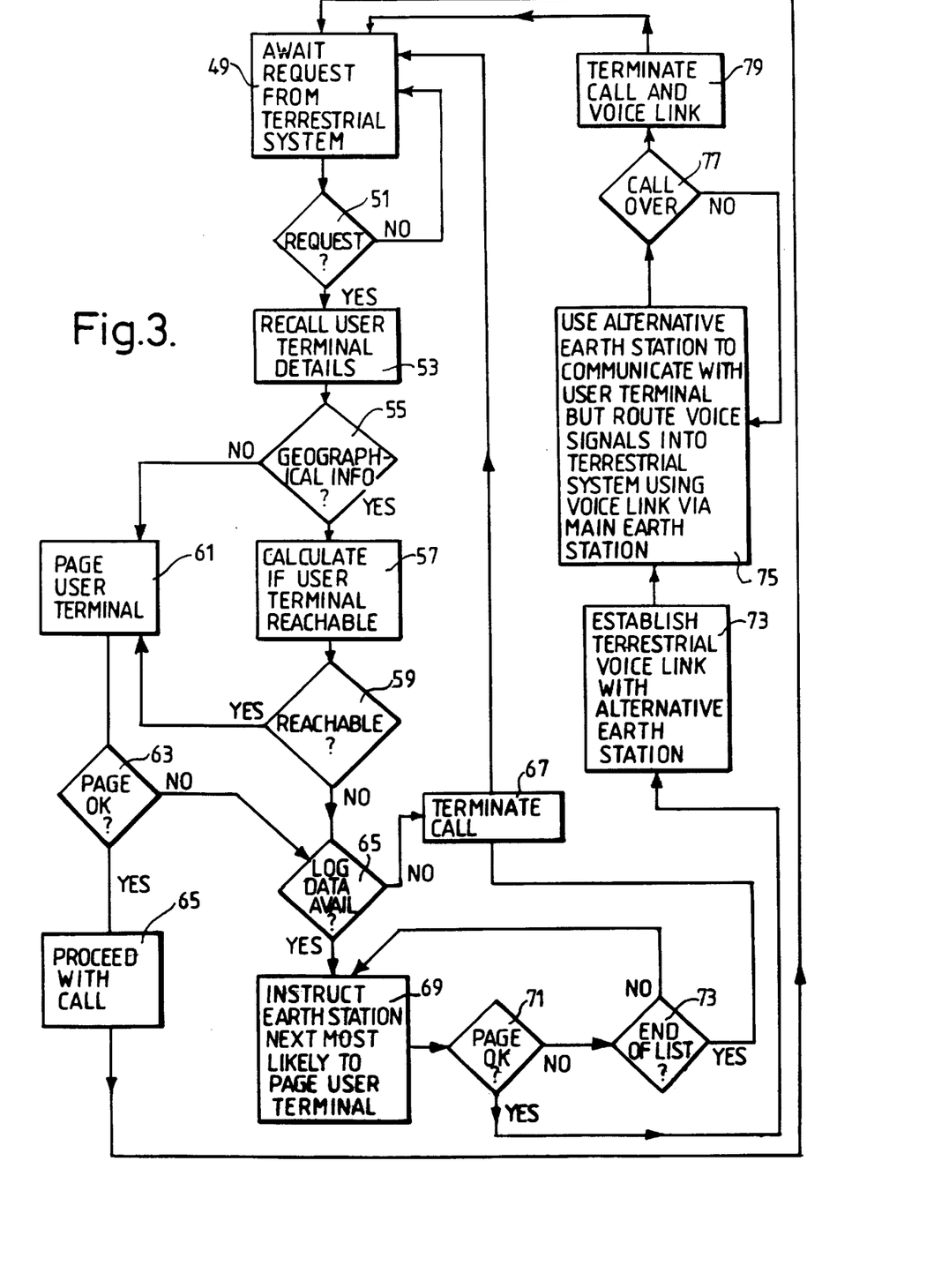
FIG. 3 is a flow chart of the activities of the main Mobile Satellite Switching Centre of FIG. 1.

FIG. 3 is a flowchart of the activities of the Mobile Satellite Switching Centre (chosen in this instance, per FIG. 1, to be 5C) whereat the user terminal 11 has been registered as a visitor location (17C).

An eighth activity 49 awaits a request from the terrestrial system 1 until a seventh test 51 detects such a request, whereupon control is passed to a ninth activity 53 which recalls the details of the particular user terminal it is desired to access from the visitor location register 17C and its associated memories.

An eighth test 55 checks the associated data to see if a geographical location is stored. This data, as was earlier described, is derived from a prior knowledge of the position of the satellites 9A–C, doppler frequency shift measurements and measurement of signal path delays to determine the location of the user terminal to within some 50 meters on the surface of the earth. If such a location is stored, control is passed to a tenth activity 57 where it is calculated whether or not, given the instant disposition of the satellites 9A–E, the user terminal 11 can contact the earth station 7C whereat it is registered as a visitor from its last recorded location. If a ninth test 59 confirms that the user terminal 11 can, at that instant, be reached, control is passed to an eleventh activity 61 which causes the user terminal 11 to be paged. If the user terminal 11 is successfully paged, a tenth test 63 passes control to a twelfth activity 65 which allows the call to the user terminal 11 to proceed and passes control back to the eighth activity 49 on call completion.

If the eighth test 55 detected no geographical details, it is still a fair bet that the particular earth station 7C whereat the user terminal 11 is listed as a visitor is the most likely earth station 7C to reach it. Accordingly, the eighth test 55, if no geographical data is available, passes control to the eleventh activity 61 which pages the user terminal in any event and proceeds with the call if successful.

If the attempt to page the user terminal 11 has failed, or if the user terminal 11 has been deemed unreachable by the ninth test 59, an eleventh test 65 checks to see if the details of the log, generated by the user terminal in the third activity 29 and sent, at last access, by the sixth activity 41, to the earth station 17C, are present. If no log data is available, the eleventh test 65 passes control to a twelfth activity 67 which terminates the attempted contact with the user terminal 11 and passes control back to the eighth activity 49 where the Mobile Satellite Switching Centre 17C awaits a further approach from the terrestrial system 1.

If the eleventh test 65 detects the presence of the log data from the user terminal 11, it passes control to a thirteenth activity 69 which causes the user terminal 11 to be addressed from another earth station 7A–E.

Let us say, for the sake of example, that the user terminal had heard 25 calls from a first earth station 7B, 50 calls from a second earth station 7C and 10 calls from a third earth station 7D. Now the earth station 7C 5C whereat the user terminal 11 is registered as a visitor is clearly unable to make contact. Accordingly, the thirteenth activity 69 selects the next most likely earth station 7B, with 25 calls in the log, to address the user terminal 11.

The Mobile Satellite Switching Centre 5C, whereat the user terminal is registered as a visitor, becomes a hub and maintains access to the terrestrial network 1 as the gateway for the user terminal 11 despite the user terminal 11 being addressed by a different earth station 7B.

Firstly, the second earth station 7C sends a message via the data link 19 to the first earth station 7B commanding the first earth station 7B to page the user terminal 11. The first earth station 7B attempts the page and reports back to the second earth station 7C whether or not the paging attempt was successful. If a twelfth test 71 detects that the paging attempt was unsuccessful, and a thirteenth test 73 detects that there are still other earth stations audible to the user terminal 11, control is passed back to the thirteenth activity 69 where the next most likely earth station 7D is selected.

For the sake of this example, let us imagine that the paging attempt from the third earth station 7D has succeeded. The twelfth test 71 passes control to a fourteenth activity 73 where the Mobile Satellite Switching Centre 5C at the second earth station 7C establishes the voice link 21 to the Mobile Satellite Switching Centre 5D at the third earth station 7D. This has earlier been described. Control is then passed to a fifteenth activity 75 where the third earth station 7D actually communicates with the user terminal 11, but the voice message and any other data for the terrestrial system 1 are passed via the voice link 21 to enter the terrestrial system 1 via the Mobile Satellite Switching Centre SC at the second earth station 7C.

When a thirteenth test 77 detects that the call is over, control is passed to a sixteenth activity 79 where the third earth station 7D is instructed to terminate its contact with the user terminal 11, the mobile satellite switching centre 5C at the second earth station 7C disconnects the voice link 21 between itself and the mobile satellite switching centre 5D at the third earth station 7D, and the mobile satellite switching centre 5C at the second earth station 7C disconnects from the terrestrial network 1. Control then passes back to the eighth activity 49 where the mobile satellite switching centre 5C at the second earth station 7C awaits requests from the terrestrial system 1.

Had the log from the user terminal 11 been otherwise than as in the example given, the thirteenth activity 69 would simply have gone down the list of earth stations 7A–E in descending order of their probability of accessibility to the user terminal 11 as reflected by the number of entries against each one in the log, until one was found that could execute a successful page of the user terminal 11.

The twelfth activity 67 can also have another variant where log information is not available. Instead of simply terminating the call, in the twelfth activity 67 the mobile satellite switching centre 5C at the second earth station 7C uses the digital link 19 to instruct other earth stations 7C, in the geographic vicinity of where the user terminal 11 was believed to be, or simply surrounding the second earth station 7C, to see if a successful page could be executed. If a page succeeds, the contact is made via the other earth station 7A–E as described above. If a successful page is not possible, the call is terminated.

As an example of this last variant, if a user terminal is believed to be somewhere in the Caribbean, but cannot be paged from a North American earth station 7 where its visitor location is stored, because of its location the user terminal might be accessible from earth stations 7 in South America or Africa. Accordingly, the North American earth station 7 causes the African and South American earth stations 7 to attempt to page the user terminal 11.

If no information is available concerning the likely location of the user terminal 11, its visitor location earth station 7 in North America commands not only the South American and African earth stations 7 to attempt to page the user terminal 11, but also in Europe, the Pacific Rim and the polar region. In this way the earth station 7 whereat the user terminal has its visitor location does its best to complete the ring around itself so that, no matter in which direction the user terminal 11 may have escaped, it can be found.

A variant exists for the tenth activity 57. Instead of simply taking the last known geographical location of the user terminal 11, the times and locations of the user terminal 11 on a previous plurality of accesses are used to plot, for example, a speed and direction for the user terminal 11 which would be of great utility if the user terminal were on a rapidly moving transport such as a jet aircraft or a low orbiting spacecraft. An estimate of the present location can then be made when calculating whether or not the user terminal 11 is accessible and the appropriate earth station 7 closest to the estimated location instructed to page the user terminal 11.

The user terminal 11 comprises a subscriber identity module (popularly known as a SIM) in the form of a smartcard, insertable into the body of the user terminal, containing identity and other information, and comprising a microprocessor and associated programs to execute the proper running and responses of the user terminal. Those, skilled in the art, will be well aware of the nature of these SIMs. It is preferred, in this embodiment of the invention, that the necessary software and processing ability for the user terminal is incorporated into the SIM. Those, skilled in the art, will be aware that this is merely a convenient solution, and that the ability to execute the sequence of actions and tests can be otherwise incorporated into the user terminal 11. Equally, the sequence of activities and tests ascribed to the mobile satellite switching centres 5A–E and earth stations 7A–E are preferred to be contained as part of the working of the already present supervisory processing capability and software, but may otherwise be incorporated.

We claim:

1. A communication system having a user terminal that can communicate with a plurality of satellites and each of said plurality of satellites can communicate with a plurality of earth stations; in which each of said plurality of satellites is operative, periodically, to provide messages, receivable by said user terminal, indicating with which of said plurality of earth stations said each satellite is in communications; in which said user terminal is configured to maintain a running log indicative of the number of instances it has received a message from a satellite indicating communications with a particular earth station.

2. A system according to claim 1 in which said user terminal, when attempting to establish contact with an earth station, is configured to page an earth station having the largest number of entries in said log, and, in the event that a page to said earth station having the largest number of entries in said log should fail, is configured to page earth stations in said log, in turn, in descending order of number of entries, until an earth station is found which responds to being paged.

3. A system according to claim 1, configured to receive said log from said user terminal and thereafter, when attempting to page said user terminal, to employ that earth station with the largest number of entries in said log, and, in the event said earth station with the largest number of entries in said log is unable to successfully page said user terminal, employing each earth station, in said log, in turn, in descending order of number of entries in said log, to page said user terminal until an earth station is found which can successfully page said user terminal.

4. A system, according to claim 1, wherein said log includes only those entries noted over an immediately preceding predetermined period of time.

5. The system of claim 1 in which said user terminal is configured to employ said log to select which earth station out of said plurality of earth stations should be used to establish communications.

6. A method for controlling a system having a user terminal that can communicate with a plurality of satellites and each of said plurality of satellites can communicate with a plurality of earth stations, in which each of said plurality of satellites is operative, periodically, to provide messages, receivable by said user terminal, indicating with which of said plurality of earth stations said each of said plurality of satellites is in communications; said method including the steps of: maintaining a running log at said user terminal indicative of the number of times said user terminal has received a message from a satellite indicating contact with a particular earth station; and employing said log to control which, out of said plurality of earth stations, the user terminal should use to establish contact.

7. A method according to claim 6 including the step of paging each earth station on said log, in turn, in descending order of number of entries on said log, until an earth station is found which responds to being paged.

8. A method according to claim 6 including the steps of receiving said log from said user terminal and, when attempting to establish contact with said user terminal, of employing each earth station, on said log, in turn, in descending order of numbers of entries in said log, until an earth station is found which can establish contact with said user terminal.

9. A method, according to claim 6, wherein said log includes only those entries noted over an immediately preceding predetermined period of time.

10. A user terminal for use in a system wherein said user terminal can communicate with a plurality of satellites and wherein each of said plurality of satellites is operative, periodically, to provide messages indicating with which particular earth station, out of a plurality of earth stations, the satellite is in communications; said user terminal comprising a receiving mechanism for receiving said messages; a storage mechanism for maintaining a running log of the number of times each earth station is indicated in said messages; and when attempting to page an earth station, a paging mechanism operative to page each earth station in said log, in turn, in descending order of the number of entries in said log, until an earth station is found which responds to being paged.

11. A user terminal according to claim 10 wherein said log includes only those entries noted over an immediately preceding predetermined period of time.

* * * * *

UNITED STATES PATENT AND TRADEMARK OFFICE
CERTIFICATE OF CORRECTION

PATENT NO. : 6,115,606
DATED : September 5, 2000
INVENTOR(S) : Samuel G. Munoz-Garcia, et al.

It is certified that error appears in the above-indentified patent and that said Letters Patent is hereby corrected as shown below:

On the title page insert item --[30]

9617774.6 GB 24 August 1996 --.

Signed and Sealed this

First Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO.    : 6,115,606
DATED         : September 5, 2000
INVENTOR(S)   : Samuel G. Munoz-Garcia, et al.

Page 1 of 1

It is certified that error appears in the above-identified patent and that said Letters Patent is hereby corrected as shown below:

<u>Title page,</u>
Insert item -- [30] 9617774.6    GB    24 August 1996 --.

Signed and Sealed this

Eleventh Day of September, 2001

Attest:

Attesting Officer

NICHOLAS P. GODICI
Acting Director of the United States Patent and Trademark Office